US012789249B2

(12) United States Patent
Nakoshi et al.

(10) Patent No.: US 12,789,249 B2
(45) Date of Patent: Nov. 10, 2026

(54) PLATE-LIKE MATERIAL FEEDING DEVICE

(71) Applicant: AIDA ENGINEERING, LTD., Kanagawa (JP)

(72) Inventors: Seiji Nakoshi, Kanagawa (JP); Satoshi Abe, Kanagawa (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 244 days.

(21) Appl. No.: 18/743,833

(22) Filed: Jun. 14, 2024

(65) Prior Publication Data

US 2024/0424547 A1 Dec. 26, 2024

(30) Foreign Application Priority Data

Jun. 22, 2023 (JP) ................................ 2023-102494

(51) Int. Cl.

| | |
|---|---|
| ***B21D 43/09*** | (2006.01) |
| ***B65G 15/16*** | (2006.01) |
| ***B65H 5/06*** | (2006.01) |

(52) U.S. Cl.

CPC ............ *B21D 43/09* (2013.01); *B65H 5/062* (2013.01); *B65G 15/16* (2013.01)

(58) Field of Classification Search

CPC ......... B21D 43/09; B65H 5/062; B65G 15/16

USPC ...................................................... 198/626.4

See application file for complete search history.

(56) References Cited

U.S. PATENT DOCUMENTS

| | | | | | |
|---|---|---|---|---|---|
| 3,493,159 | A * | 2/1970 | Edwards | B21D 43/09 226/142 |
| 3,850,355 | A * | 11/1974 | Downie | F16H 53/00 226/110 |
| 3,907,188 | A | 9/1975 | Peterson | |
| 4,029,251 | A * | 6/1977 | Johnson | B65H 20/04 226/176 |
| 4,078,416 | A * | 3/1978 | Voorhees | B65H 20/04 226/178 |

(Continued)

FOREIGN PATENT DOCUMENTS

| | | | |
|---|---|---|---|
| JP | 2000-225427 | A | 8/2000 |
| JP | 2003-154424 | A | 5/2003 |

(Continued)

OTHER PUBLICATIONS

Extended European Search Report dated Nov. 12, 2024, from corresponding EP Application No. 24182383.0, 8 pages.

*Primary Examiner* — James R Bidwell
(74) *Attorney, Agent, or Firm* — Rimon P.C.

(57) ABSTRACT

A plate-like material feeding device configured to convey a plate-like material by sandwiching the plate-like material between a lower roll and an upper roll performs switching between a clamping state in which at least one of the upper roll or the lower roll is brought close to another one and a releasing state in which the at least one of the upper and lower rolls is separated away from another one by moving a cam follower in accordance with an outer peripheral profile of a circular cam. The outer peripheral profile of the circular cam has a projecting portion in a range different from a rotation angle range of the circular cam during operation, and has a recessed portion, which is formed in a vicinity of the top of the projecting portion and is configured to receive a part of an outer periphery of the cam follower.

8 Claims, 9 Drawing Sheets

(56) References Cited

U.S. PATENT DOCUMENTS

| | | | | | |
|---|---|---|---|---|---|
| 4,304,348 | A | * | 12/1981 | Kato | B65H 20/04 226/166 |
| 4,415,108 | A | | 11/1983 | Katoh | |
| 5,808,465 | A | * | 9/1998 | Gentile | B21D 43/09 324/207.17 |
| 2019/0366416 | A1 | | 12/2019 | Suzuki | |

FOREIGN PATENT DOCUMENTS

| | | | |
|---|---|---|---|
| JP | 2009-106990 | A | 5/2009 |
| WO | 2018/096903 | A1 | 5/2018 |

* cited by examiner

FIG. 2D
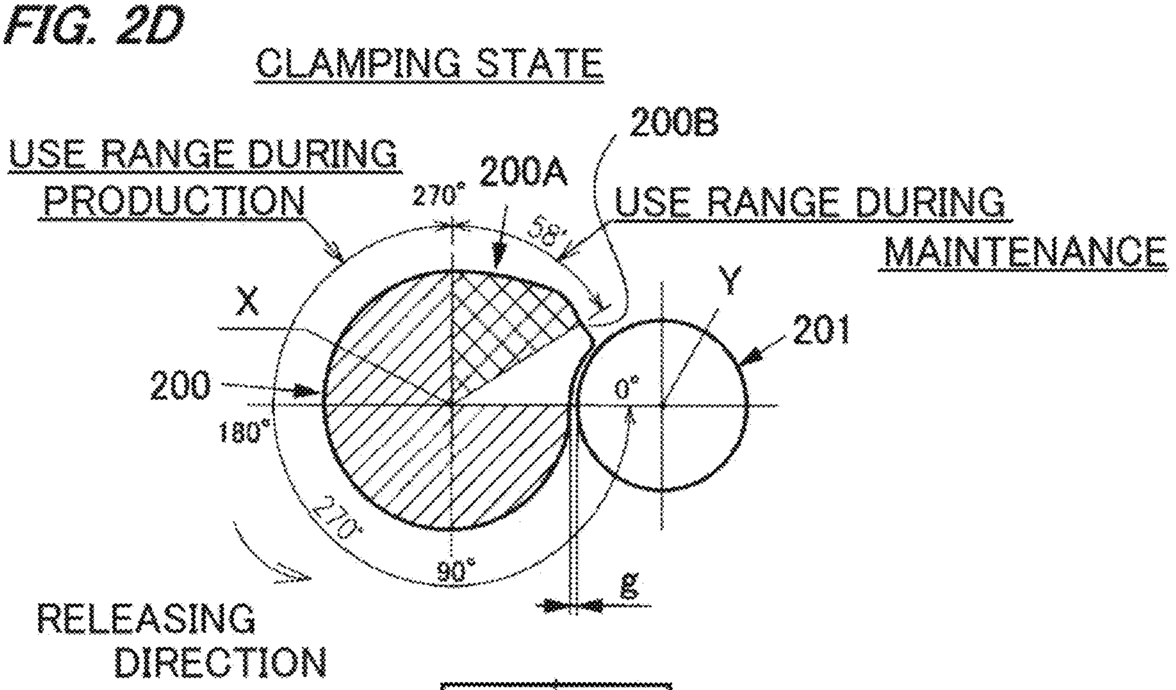
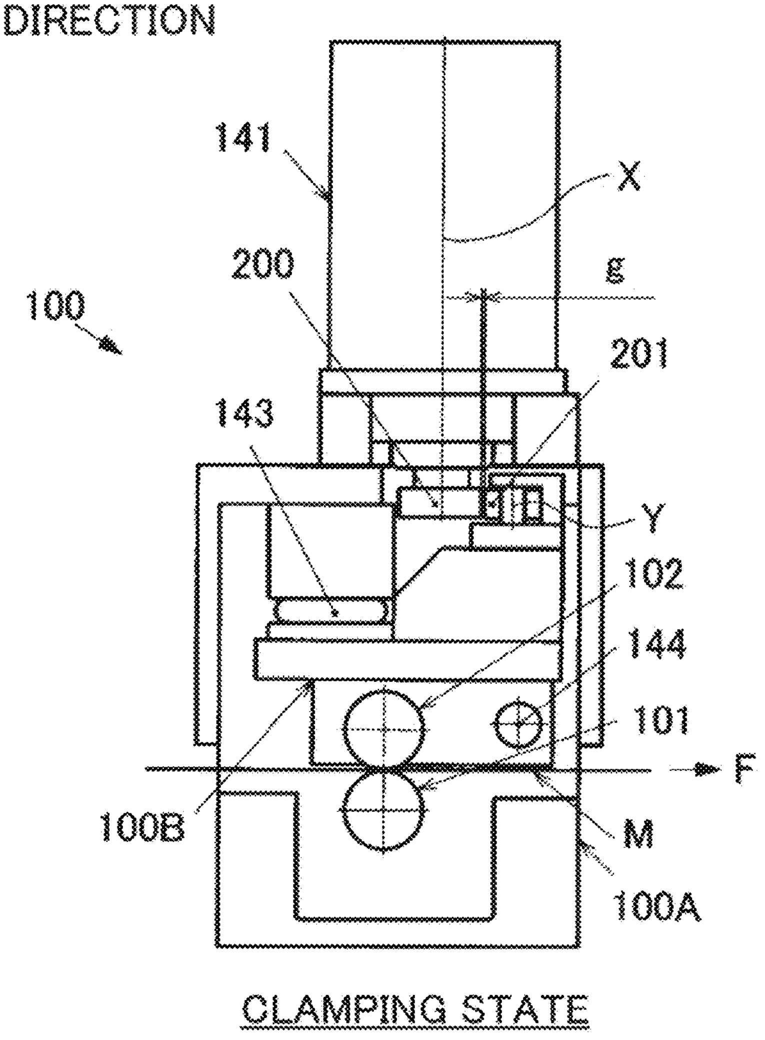
FIG. 2A

FIG. 2E
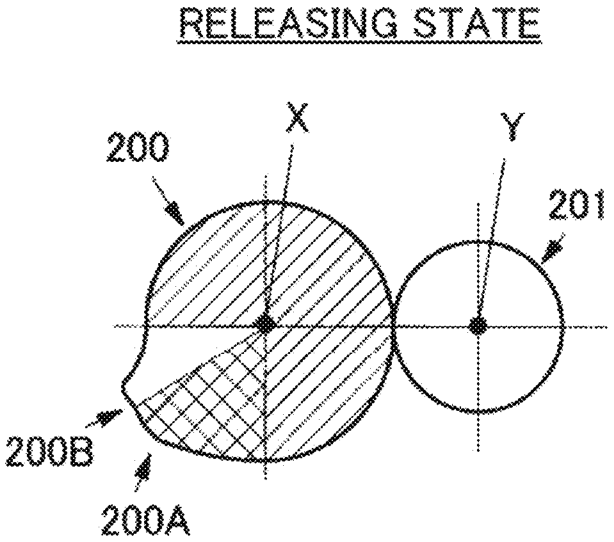
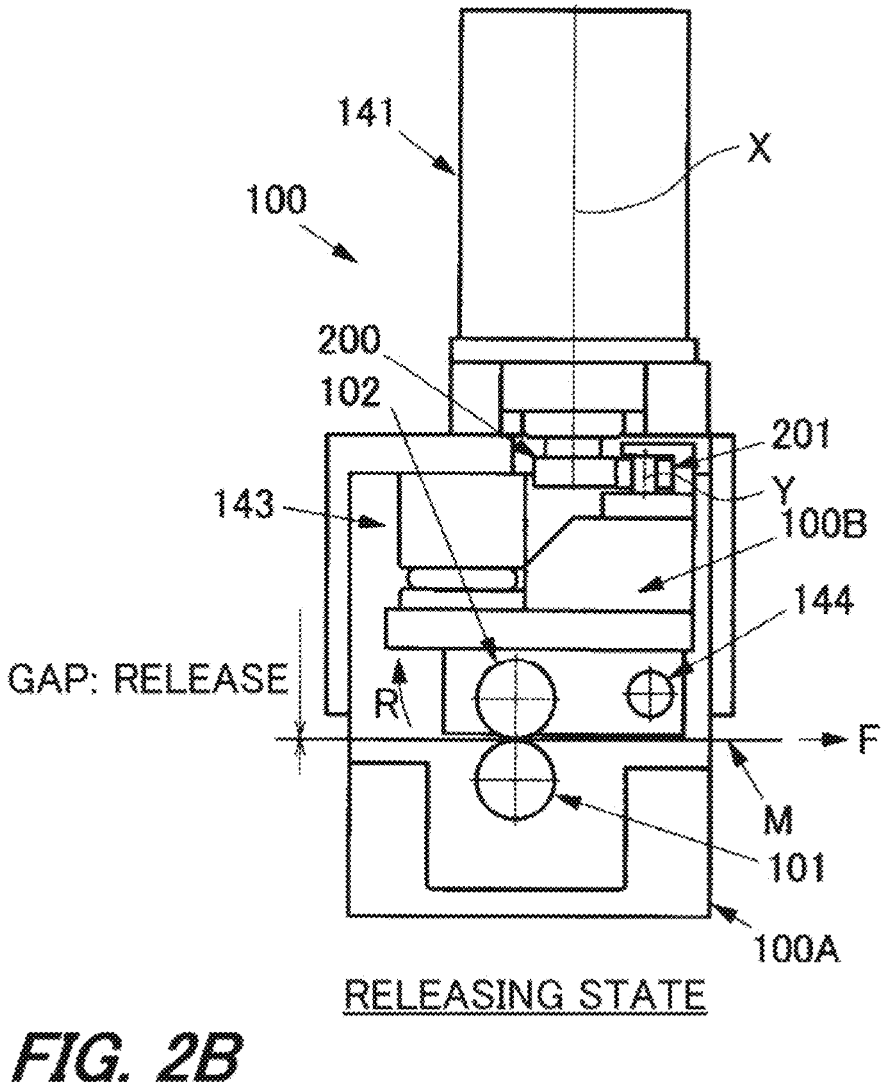
FIG. 2B

FIG. 2F
STATE DURING MAINTENANCE
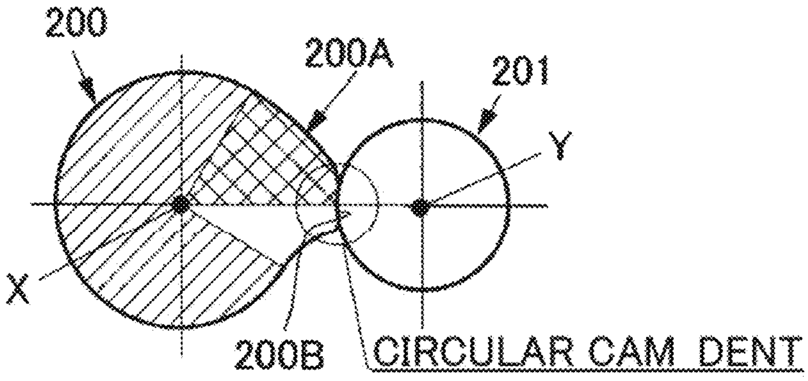
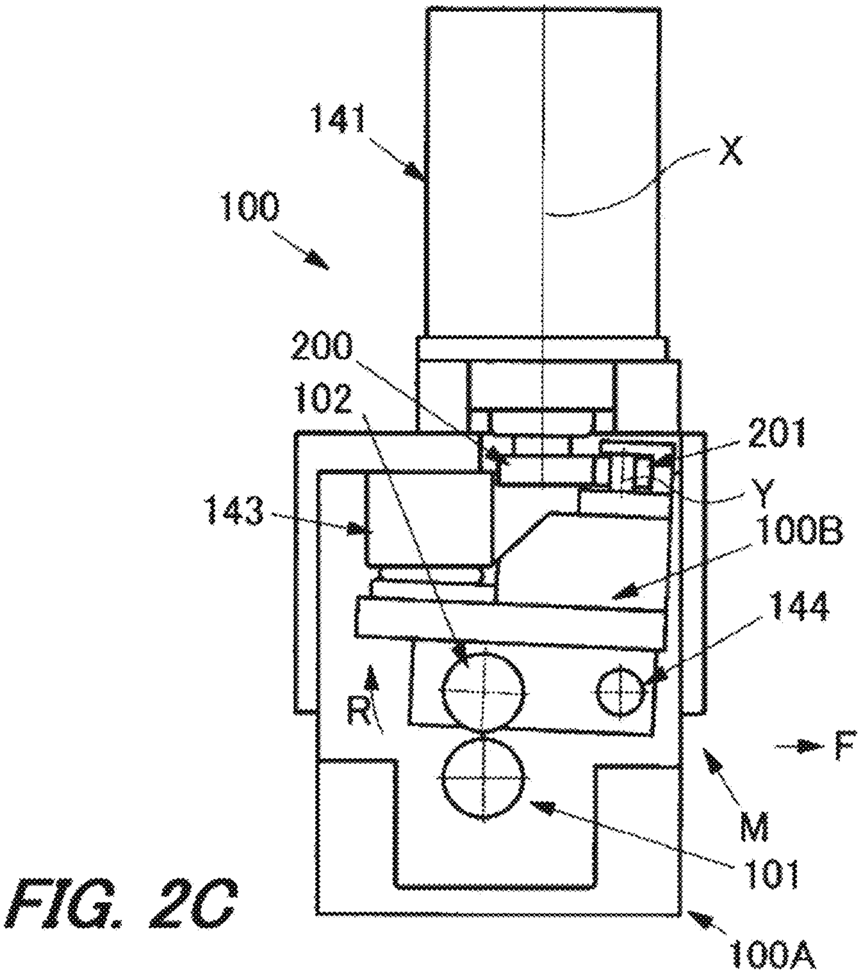
FIG. 2C
STATE DURING MAINTENANCE

CLAMPING STATE

RELEASING STATE

STATE DURING MAINTENANCE

PLATE-LIKE MATERIAL FEEDING DEVICE

CROSS-REFERENCE TO RELATED APPLICATIONS

The present application claims priority from Japanese Patent Application No. 2023-102494 filed on Jun. 22, 2023, the entire contents of which are hereby incorporated by reference.

BACKGROUND OF THE INVENTION

1. Field of the Invention

The present invention relates to an improved technology of a plate-like material feeding device that feeds a plate-like material to a downstream side (next process), for example, a plate-like material feeding device that conveys a plate-like material to be supplied to a press machine.

2. Description of the Related Art

Hitherto, as a technology of supplying a plate-like material (blank material in a sheet shape) to a press machine, for example, there has been known a material feeding device that conveys a plate-like material by sandwiching the plate-like material between an upper roll and a lower roll and rotationally driving at least one of the upper roll or the lower roll under the sandwiching state.

Here, the material feeding device of this type is provided with a mechanism capable of performing switching between a clamping state of sandwiching the plate-like material between the upper roll and the lower roll with a predetermined pressing force to give a conveyance force to the plate-like material, and a releasing state of releasing a plate-like material from the upper roll and the lower roll when the press machine performs press working.

A device described in Patent Literature 1 is configured to be capable of performing switching between a clamping state in which an upper roll is elastically urged against a lower roll and a plate-like material through a link mechanism, and a releasing state in which a circular cam held in abutment against the link mechanism is rotated by a motor so as to separate the upper roll away from the lower roll by a predetermined distance in accordance with an outer peripheral shape of the circular cam (see FIG. 2 of Patent Literature 1).

A device described in Patent Literature 2 is configured to be capable of performing switching between a clamping state and a releasing state of an upper roll with respect to a lower roll and a plate-like material with a configuration in which a rotational motion of a motor is converted into a linear motion of a slide piece so as to enable the upper roll to come close to or separate away from (advance to or retreat from) the lower roll through use of an inclined cam engaged with the slide piece.

A device described in Patent Literature 3 is configured to be capable of performing switching between a clamping state and a releasing state by linearly moving a rectilinear cam by an air cylinder in a reciprocating manner to thereby vertically move a lower roll through a cam follower that is vertically moved along a profile of the rectilinear cam.

Herein, Patent Literature 1 corresponds to Japanese Patent Application Laid-open No. 2000-225427, Patent Literature 2 corresponds to WO2018/096903, and Patent Literature 3 corresponds to Japanese Patent Application Laid-open No. 2009-106990.

Here, during recovery and adjustment work at the time of jamming (or clogging) with the plate-like material, and skew feed or meandering feed of the plate-like material, and during maintenance work such as roll cleaning, it is required to bring the rolls into the releasing state, and cut off power of the material feeding device for safety.

Accordingly, in the device described in Patent Literature 1, in order to retain the rolls at positions for the releasing state, it is required to provide additional means such as a motor brake.

Further, also in the device described in Patent Literature 2, the rolls may drop due to vibrations and an impact during work. In order to keep the positions of the rolls, it is required to provide additional brake means or the like similarly to that in Patent Literature 1.

The device described in Patent Literature 3 has the structure in which the lower roll is kept at a releasing position even when the power is cut off. However, a mechanism for adjusting a position of the upper roll in accordance with a thickness of a plate material is additionally required, which brings about the complicated structure.

Further, it is desired that, during the above-mentioned adjustment work and maintenance work, for achieving good workability, the upper roll and the lower roll can be separated away from each other with a separation amount (opening amount) larger than that in the normal releasing state.

In particular, a releasing device using the circular cam as in Patent Literature 1 has the structure in which a cam follower side is moved by the circular cam to thereby make the clamping state and the releasing state, and the releasing device generates a clamping force owing to a pressing force applied by the circular cam. Thus, in order to stably convey the plate-like material, it is required to precisely measure a plate thickness and reproduce a rotational angle position of the circular cam corresponding to the plate thickness. However, during maintenance work for the device, when a control origin of the circular cam is lost, it is required to reset the control origin of the circular cam. A worker who performs this resetting is required to be highly skilled, and the work itself is complicated and time-consuming.

SUMMARY OF THE INVENTION

According to at least one aspect of the present invention, there is provided a plate-like material feeding device, which is configured to convey a plate-like material by sandwiching the plate-like material between a lower roll rotatably supported on a device main body and an upper roll, which is rotatable and arranged in parallel to the lower roll, and giving rotational drive to at least one of the lower roll or the upper roll, the plate-like material feeding device including: a clamping and releasing mechanism configured to perform switching between a clamping state in which at least one of the upper roll or the lower roll coupled to a cam follower is brought close to another one and a releasing state in which at least one of the upper roll or the lower roll is separated away from another one by moving the cam follower in accordance with an outer peripheral profile of a circular cam, the plate-like material feeding device being configured to convey the plate-like material under the clamping state, and release the plate-like material in the releasing state during operation. The outer peripheral profile of the circular cam has a projecting portion formed to increase a lift amount in a range different from a rotation angle range during the operation that is from a rotational angle position of the circular cam in the clamping state to a rotational angle position of the circular cam in the releasing state, and has a recessed portion, which is formed in a vicinity of the top of the projecting portion and is configured to receive a part of an outer periphery of the cam follower in contact with at least two points, or a recessed portion configured to receive a part of the outer periphery of the cam follower in surface contact with a part of a bottom surface of the recessed portion.

In at least one aspect of the present invention, in a cross section of the recessed portion orthogonal to a center axis of the circular cam, when the recessed portion of the circular cam and the part of the outer periphery of the cam follower are held in contact with each other at two points including a first inlet edge and a second inlet edge, the first inlet edge and the second inlet edge may be located on sides opposite to each other with respect to a straight line connecting a rotation center of the circular cam and a rotation center of the cam follower to each other.

In at least one aspect of the present invention, in a cross section of the recessed portion orthogonal to a center axis of the circular cam, when the recessed portion of the circular cam receives the part of the outer periphery of the cam follower in surface contact with the part of the bottom surface of the recessed portion, a contact surface between the circular cam and the cam follower may extend on both sides with respect to a straight line connecting a rotation center of the circular cam and a rotation center of the cam follower to each other.

In at least one aspect of the present invention, when the recessed portion of the circular cam and the part of the outer periphery of the cam follower are held in contact with each other at two points including the first inlet edge and the second inlet edge, during maintenance, rotation of the circular cam may be prevented by applying, to the two points, a self-weight of an oscillation frame coupled to the cam follower.

In at least one aspect of the present invention, when the recessed portion of the circular cam and receives the part of the outer periphery of the cam follower in surface contact with the part of the bottom surface of the recessed portion, during maintenance, rotation of the circular cam may be prevented by applying, to a surface contact portion between the circular cam and the cam follower, a self-weight of an oscillation frame coupled to the cam follower.

In at least one aspect of the present invention, under a state in which the recessed portion of the circular cam receives the part of the outer periphery of the cam follower in contact with at least two points, or a state in which the recessed portion of the circular cam receives the part of the outer periphery of the cam follower in surface contact with the part of the bottom surface, the cam follower may have a lift amount larger than a lift amount of the cam follower in the releasing state.

BRIEF DESCRIPTION OF THE DRAWINGS

FIG. 2A is a right-hand side view for illustrating the plate-like material feeding device in a clamping state.

FIG. 2B is a right-hand side view for illustrating the plate-like material feeding device in a releasing state.

FIG. 2C is a right-hand side view for illustrating the plate-like material feeding device in a state during maintenance.

FIG. 2D is an enlarged view for illustrating a circular cam and a cam follower in the clamping state.

FIG. 2E is an enlarged view for illustrating the circular cam and the cam follower in the releasing state.

FIG. 2F is an enlarged view for illustrating the circular cam and the cam follower in the state during maintenance.

DESCRIPTION OF THE EMBODIMENTS

Now, a plate-like material feeding device (conveying device) according to an embodiment of the present invention is described with reference to the attached drawings. The present invention is not limited by examples described below. The plate-like material may be referred to as, for example, "sheet-like material," "workpiece," or "plate-like raw material."

A plate-like material feeding device 100 according to this embodiment is a device for feeding a plate-like material to, for example, a press machine, and may be arranged on at least one of an upstream side or a downstream side of the press machine.

Herein, it is only required that the plate-like material be a material having a plate shape. Alternatively, the plate-like material may be an elongated plate-like material wound into a roll shape or pieces of a plate-like material in a sheet shape.

The present invention has been made in view of the above-mentioned various circumstances, and has an object to provide a user-friendly plate-like material feeding device that may easily adjust a clamping state and a releasing state in accordance with a thickness of the plate-like material, may smoothly make a state during maintenance with a sufficient opening amount, may safely keep the state, and does not require, for example, setting of a positional relationship between a circular cam and a cam follower side after maintenance work or the like, while keeping a relatively simple and low-cost configuration.

Figure 1A:
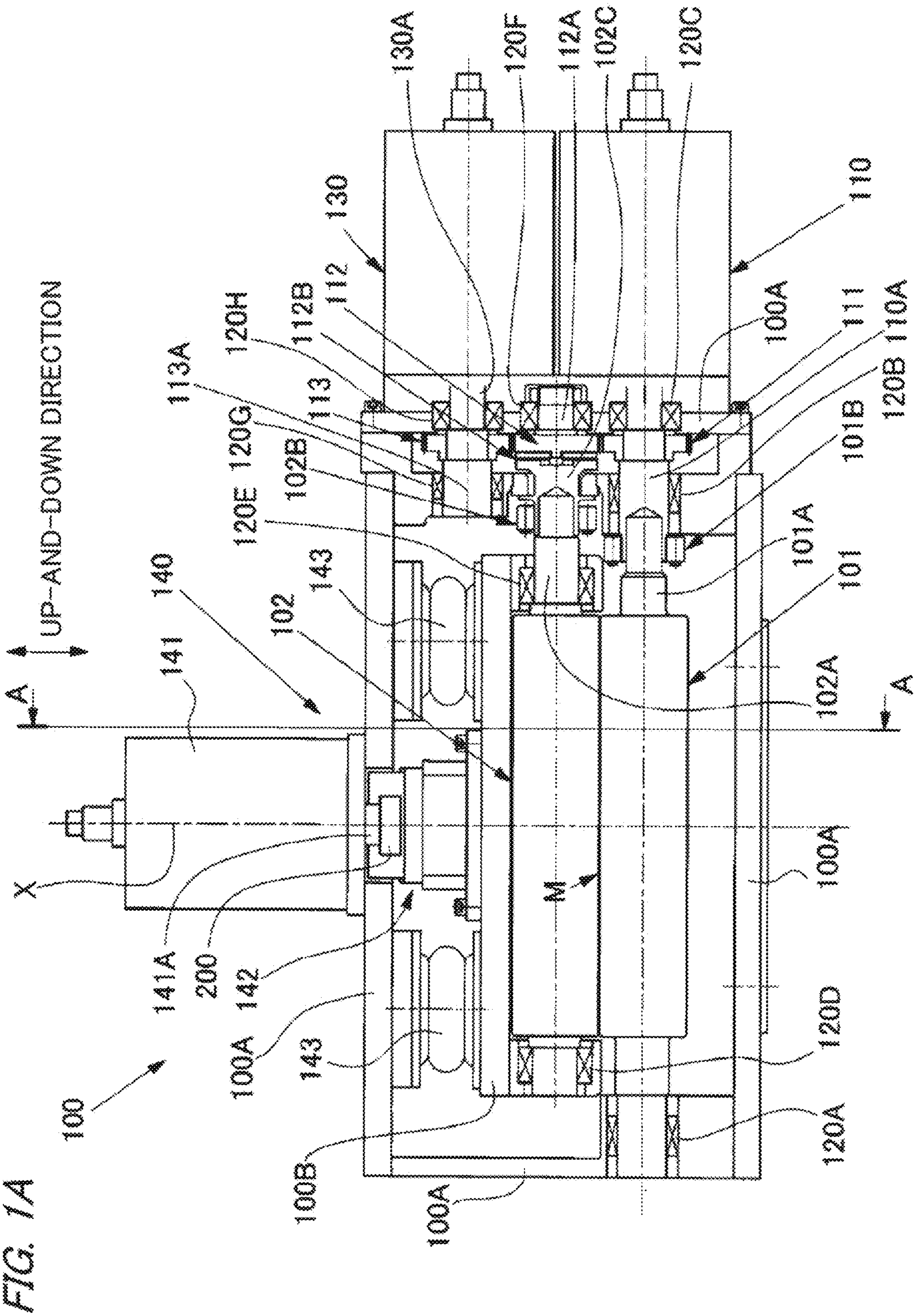
FIG. 1A is a front view for illustrating an example of a configuration of a plate-like material feeding device according to one embodiment of the present invention.
Figure 1B:
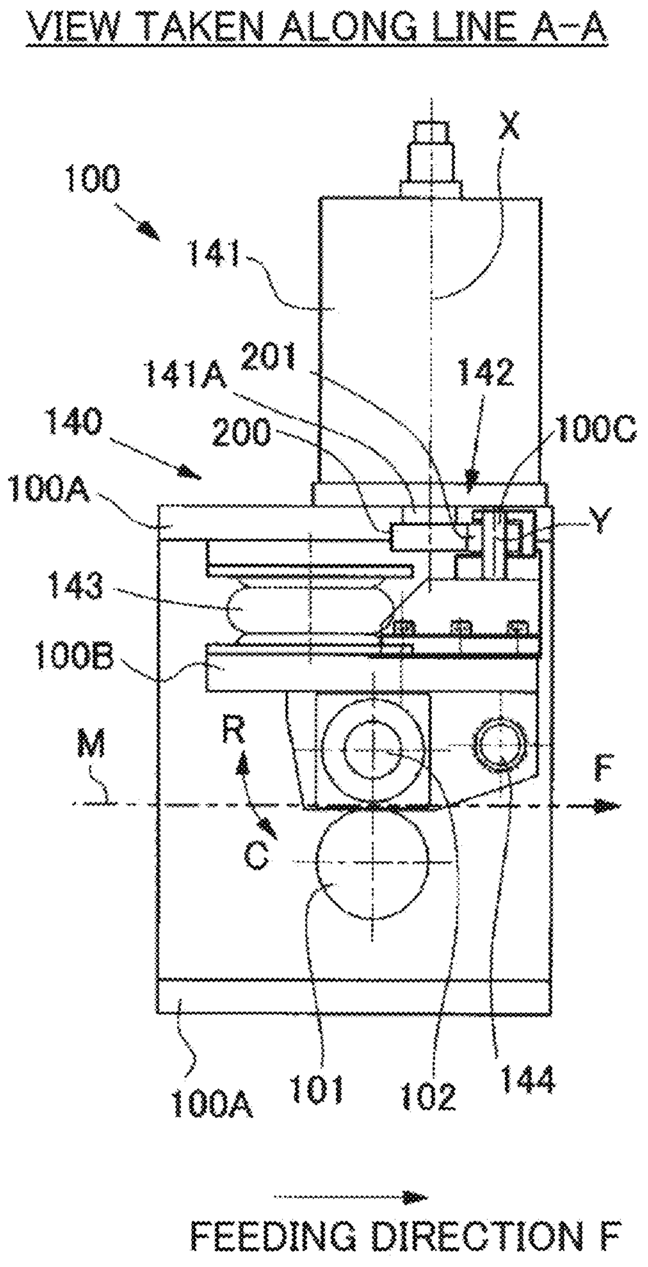
FIG. 1B is a view taken along the line A-A of FIG. 1A.

As illustrated in FIG. 1A and FIG. 1B, the plate-like material feeding device 100 according to this embodiment includes a lower roll 101 and an upper roll 102 arranged in parallel to the lower roll 101 with a predetermined gap. A plate-like material M is supplied to the predetermined gap between the lower roll 101 and the upper roll 102.

A lower-roll rotation shaft 101A of the lower roll 101 has one end side rotationally coupled to an output shaft 110A of a lower-roll drive motor 110 by a lower friction fastener 101B or the like. This coupling may also be achieved by spline coupling or the like.

A lower outer periphery gear (lower gear) 111 is mounted to the output shaft 110A substantially integrally. An intermediate outer periphery gear (intermediate gear) 112 is meshed with the lower outer periphery gear 111 on an upper side of the lower outer periphery gear 111.

A rotation shaft 112A of the intermediate outer periphery gear 112 is rotationally coupled to an intermediate rotation element 102C through intermediation of an Oldham's joint 112B. The intermediate rotation element 102C is rotationally coupled to an upper-roll rotation shaft 102A of the upper roll 102 through intermediation of an upper friction fastener 102B or the like. This coupling may also be achieved by spline coupling or the like.

The lower friction fastener 101B and the upper friction fastener 102B are mechanical elements that coaxially fasten two rotation shafts by fastening a bolt or the like by a wedge method using a wedge action, or mechanical elements that coaxially fasten two rotation shafts by a hydro method (hydraulic method) using the Pascal's principle.

The lower roll 101, the lower-roll rotation shaft 101A, the output shaft 110A, and the lower outer periphery gear 111 are rotationally supported on a device main-body frame 100A (casing or the like) through intermediation of bearings 120A, 120B, and 120C. The lower-roll drive motor 110 is mounted to the device main-body frame 100A substantially integrally.

The upper roll 102, the upper-roll rotation shaft 102A, and the intermediate rotation element 102C are rotationally supported on an oscillation frame 100B through intermediation of bearings 120D and 120E. Meanwhile, the rotation shaft 112A of the intermediate outer periphery gear 112 is rotationally supported on the device main-body frame 100A through intermediation of a bearing 120F.

The lower outer periphery gear 111 and the intermediate outer periphery gear 112 are gears having the same module and the same number of teeth. The oscillation frame 100B is supported on the device main-body frame 100A so as to be freely swingable about an oscillation shaft 144, and is configured to be swingable in a clamping direction C and a releasing direction R in FIG. 1B through a clamping and releasing mechanism 140.

In this embodiment, the intermediate outer periphery gear 112 is meshed with an upper outer periphery gear (upper gear) 113, and a rotation shaft 113A of the upper outer periphery gear 113 is formed integrally with an output shaft 130A of an upper-roll drive motor 130. The rotation shaft 113A of the upper outer periphery gear 113 is rotationally supported on the device main-body frame 100A through intermediation of bearings 120G and 120H. The upper-roll drive motor 130 is mounted to the device main-body frame 100A substantially integrally and on the same side as the lower-roll drive motor 110 with respect to the lower roll 101 and the upper roll 102.

The clamping and releasing mechanism 140 includes a clamping and releasing motor 141 supported on the device main-body frame 100A substantially integrally. A circular cam 200, which is one of components of a rotation and oscillation motion conversion mechanism 142, is coaxially mounted to a rotation output shaft 141A of the clamping and releasing motor 141. Accordingly, the circular cam 200 is rotated about a rotation center X of the rotation output shaft 141A.

The cam follower 201, which is one of components of the rotation and oscillation motion conversion mechanism 142, is arranged on an outer periphery of the circular cam 200. The cam follower 201 is supported so as to be freely rotatable about a support shaft 100C of the oscillation frame 100B. Accordingly, the circular cam 200 is rotated about a rotation center Y being a center of the support shaft 100C.

In other words, the cam follower 201 is coupled to the oscillation frame 100B and the upper roll 102, and those components are configured to be integrally swingable about the oscillation shaft 144.

Figure 3:
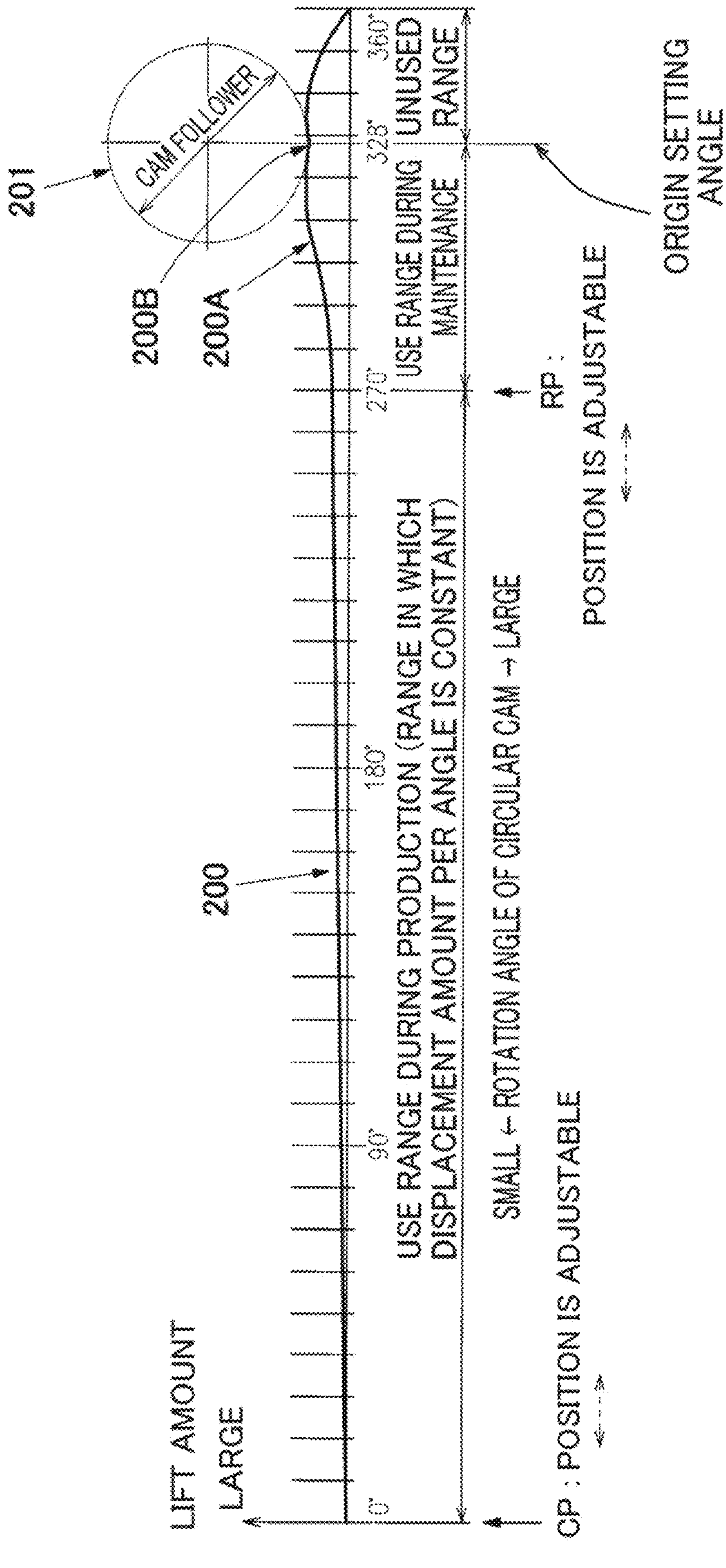
FIG. 3 is a graph for showing an outer peripheral profile (cross-sectional shape) of the circular cam in the embodiment with a rotational angle position represented by the horizontal axis and a lift amount represented by the vertical axis.

An outer peripheral profile of the circular cam 200 is formed into, for example, a shape as illustrated in FIG. 3. FIG. 3 is a graph for showing a cross-sectional shape of the circular cam 200 illustrated in FIG. 2D to FIG. 2F with a rotational angle position represented by the horizontal axis and a lift amount represented by the vertical axis.

Further, the clamping and releasing mechanism 140 includes a gas spring device 143 being an example of an actuator. With the gas spring device 143, such a predetermined pressing force is applied as to swing the oscillation frame 100B and, in turn, the upper roll 102 about the oscillation shaft 144 toward a downward direction (clamping direction C).

Accordingly, when the rotation output shaft 141A of the clamping and releasing motor 141 is rotated in a predetermined direction so that the circular cam 200 is set to a clamping position CP (position around 0° on the horizontal axis of FIG. 3), as illustrated in FIG. 2A and FIG. 2D, contact of the circular cam 200 with the cam follower 201 is canceled, and the gas spring device 143 applies the predetermined pressing force so as to swing the oscillation frame 100B and, in turn, the upper roll 102 about the oscillation shaft 144 toward the clamping direction C. Thus, the plate-like material feeding device is brought into the clamping state of clamping the plate-like material M between the lower roll 101 and the upper roll 102 with the predetermined pressing force.

When the lower-roll drive motor 110 and the upper-roll drive motor 130 are rotationally driven under the clamping state, the lower roll 101 and the upper roll 102 are rotated to feed out the plate-like material M in a predetermined feeding direction F (see FIG. 1B, FIG. 2A, and the like).

However, a state in which the circular cam 200 is at the clamping position CP and the outer periphery of the circular cam 200 is held in contact with the cam follower 201 to give a pressing force to the plate-like material M sandwiched between the lower roll 101 and the upper roll 102 may be set as the clamping state.

When working is performed on the fed-out plate-like material M by, for example, the press machine in a downstream step, it is required to bring the plate-like material feeding device into the releasing state of releasing the plate-like material M from the lower roll 101 and the upper roll 102. Thus, the rotation output shaft 141A of the clamping and releasing motor 141 is rotated to shift an abutment position of the circular cam 200 abutting against the cam follower 201 to a releasing position RP (position around 270° on the horizontal axis of FIG. 3). In this manner, against the predetermined pressing force applied by the gas spring device 143, the oscillation frame 100B and, in turn, the upper roll 102 are swung (pivoted) about the oscillation shaft 144 in an upward direction (releasing direction R) to separate the lower roll 101 and the upper roll 102 away from each other by a predetermined distance (with an opening). Thus, the plate-like material feeding device is brought into the releasing state of releasing the plate-like material M (see FIG. 2B and FIG. 2E).

The clamping position CP and the releasing position RP illustrated in FIG. 3 may be changed as appropriate in accordance with a plate thickness (thickness) of the plate-like material M to be sandwiched between the lower roll 101 and the upper roll 102 or a required separation amount (opening amount), or in accordance with the pressing force of pressing the lower roll 101 and the upper roll 102 against the plate-like material M.

Further, during production in a press working line, as illustrated in FIG. 2D and FIG. 3, the circular cam 200 is rotated to reciprocate (swing or turn in forward and reverse directions) between 0° (clamping position) and 270° (releasing position) of the rotational angle position of the circular cam 200, and thus switching is performed between the clamping state and the releasing state. In this manner, the clamping and releasing motor 141 is controlled so as to sequentially repeat conveyance of the plate-like material M and press working on the plate-like material M.

Thus, in the plate-like material feeding device 100 according to this embodiment in which the clamping and releasing mechanism 140 can perform switching between the clamping state and the releasing state (alternately make the clamping state and the releasing state), the clamping and releasing mechanism 140 brings the plate-like material feeding device 100 into the clamping state, and thus the lower-roll drive motor 110 and the upper-roll drive motor 130 are rotationally driven, thereby rotating the lower roll 101 and the upper roll 102 and feeding (conveying) the plate-like material M in the predetermined feeding direction F. Moreover, the clamping and releasing mechanism 140 brings the plate-like material feeding device 100 into the releasing state, and thus the lower roll 101 and the upper roll 102 are separated away from each other by a predetermined distance (with an opening), thereby releasing the plate-like material M and hence being capable of preventing an unnecessary force from the plate-like material feeding device 100 from being applied to the plate-like material M during, for example, press working. Consequently, this can contribute to realization of satisfactory press working.

In this embodiment, the oscillation frame 100B is moved relative to the device main-body frame 100A in the up-and-down direction using the clamping and releasing mechanism 140 so that the position of the upper roll 102 in the up-and-down direction is adjusted. In this case, deviation (eccentricity) between the "upper-roll rotation shaft 102A of the upper roll 102 (intermediate rotation element 102C)" and the "rotation shaft 112A of the intermediate outer periphery gear 112", which is caused when the upper roll 102 is moved relative to the lower roll 101, can be absorbed by the Oldham's joint 112B.

Here, in order to achieve good workability during the above-mentioned adjustment or during maintenance work, the plate-like material feeding device 100 according to this embodiment is configured to be able to achieve the state during maintenance in which the upper roll 102 and the lower roll 101 are separated away from each other (with an opening) so as to have the separation amount (opening amount) larger than that in the releasing state, in addition to the clamping state and the releasing state during operation of the press working line (during production).

Specifically, as illustrated in FIG. 3, the outer peripheral profile of the circular cam 200 has a projecting portion 200A in a rotation angle range (for example, from 270° to 328°) that is different from a rotation angle range during operation (during production) (for example, from 0° to 270°) to be used for switching between the clamping state and the releasing state during operation of the press working line (during production). The projecting portion 200A is formed to gradually project up to a relatively large lift amount, and has a recessed portion 200B in a vicinity of the top of the projecting portion 200A.

During the above-mentioned adjustment and during maintenance work, in the plate-like material feeding device 100 according to this embodiment, the rotation output shaft 141A of the clamping and releasing motor 141 of the clamping and releasing mechanism 140 is rotated in a forward direction (rightward direction in FIG. 3), and the cam follower 201 is lifted by the projecting portion 200A of the outer peripheral profile of the circular cam 200. Thus, the oscillation frame 100B and, in turn, the upper roll 102 are swung (pivoted) about the oscillation shaft 144 in the upward direction (releasing direction R), and while achieving the large lift amount, and consequently, the large separation amount (opening amount) between the upper roll 102 and the lower roll 101, a part of the outer periphery of the cam follower 201 is received in the recessed portion 200B when seen from a direction orthogonal to the rotation center of the circular cam 200 (state of the cam follower 201 illustrated in FIG. 3).

This state corresponds to the state during maintenance in the present invention.

Figure 4A:
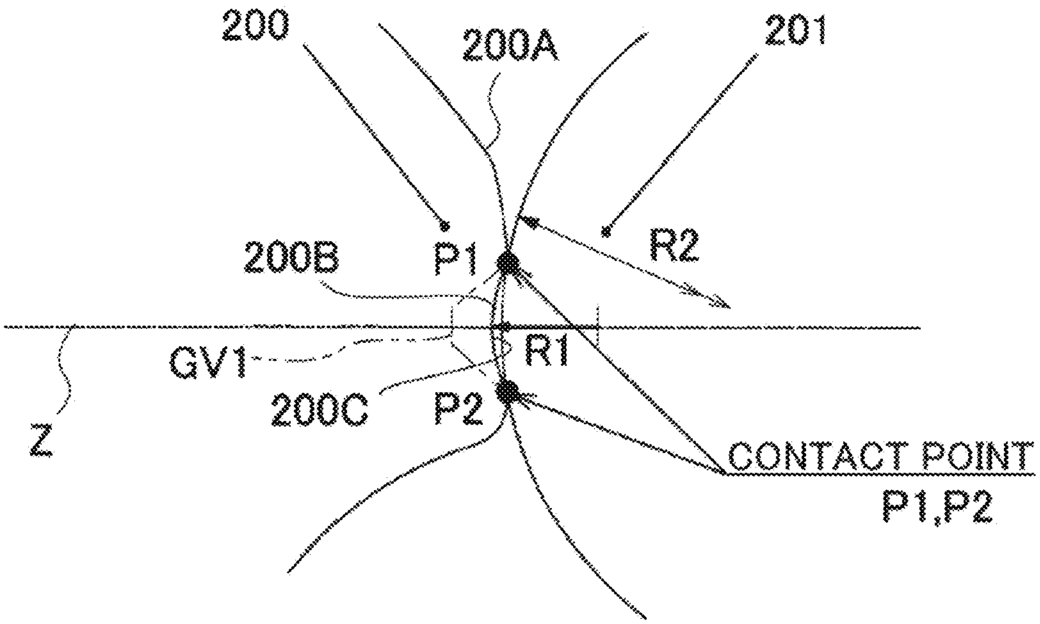
FIG. 4A is a cross-sectional view for illustrating, in an enlarged manner, an example of a state in which a part of an outer periphery of the cam follower is received in a recessed portion of the circular cam (state in which the cam follower is supported in the recessed portion at two contact points).

As an example of this receiving mode, as illustrated in FIG. 4A, there is assumed a case in which a curvature R2 of a projecting shape of the outer periphery of the cam follower 201 is larger than a curvature R1 of a recessed shape (bottom surface 200C) of the recessed portion 200B of the circular cam 200. FIG. 4A is an illustration of a cross section that is a section of a contact portion between an inlet portion of the recessed portion 200B of the circular cam 200 and the outer periphery of the cam follower 201 taken along a plane orthogonal to a rotation center axis of the circular cam 200.

Figure 5:
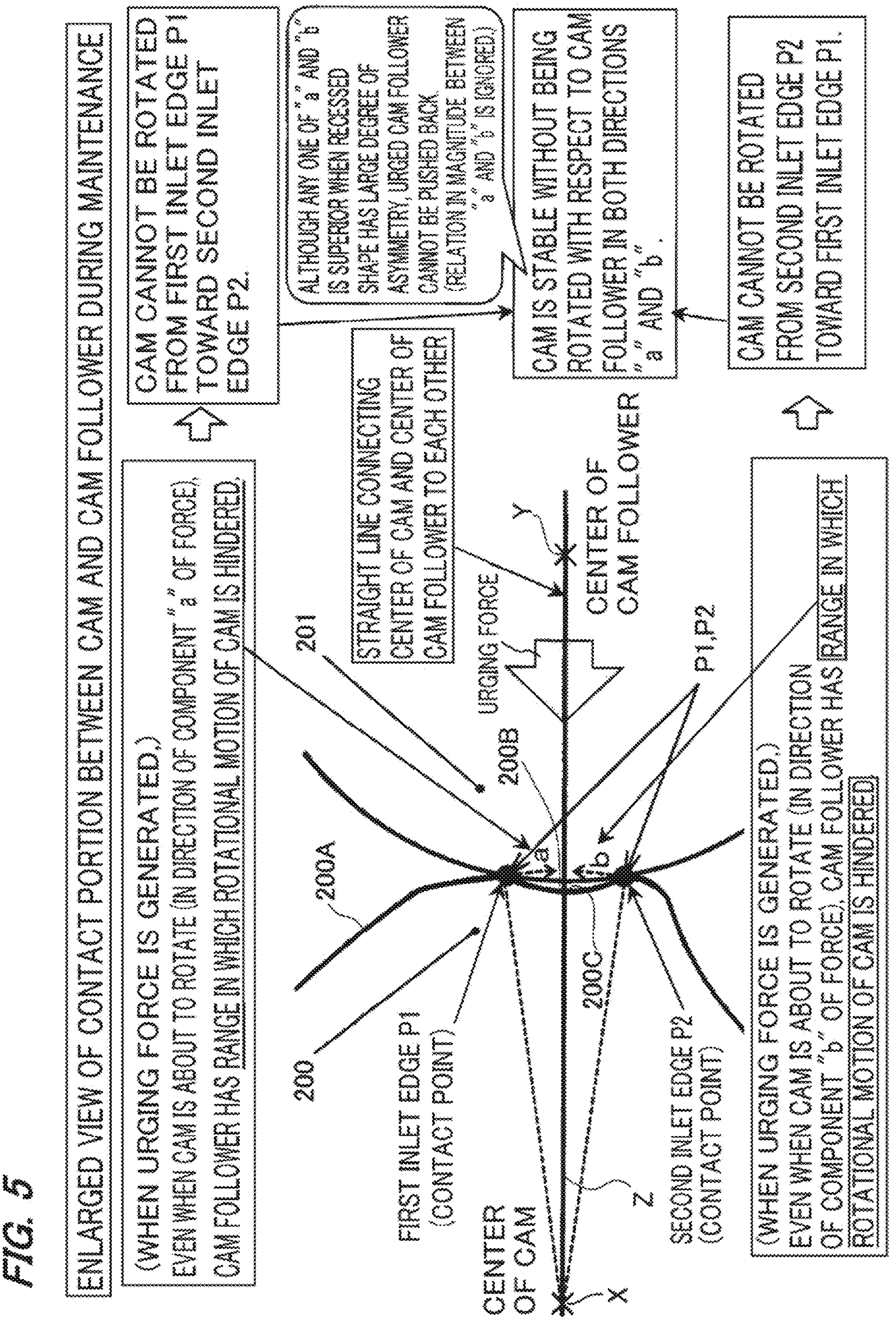
FIG. 5 is an explanatory view for illustrating difficulty over rotation of the circular cam under the state in which the part of the outer periphery of the cam follower is supported in the recessed portion of the circular cam in abutment against two contact points P1 and P2.

FIG. 5 is an enlarged view for illustrating the section of the contact portion. When the curvature R2 of the projecting shape of the outer periphery of the cam follower 201 is larger than the curvature R1 of the recessed shape (bottom surface 200C) of the recessed portion 200B of the circular cam 200, the following operations and effects are obtained.

As illustrated in FIG. 5, when the curvature R2 of the projecting shape of the outer periphery of the cam follower 201 is larger than the curvature R1 of the recessed shape of the recessed portion 200B of the circular cam 200, the recessed portion 200B and the cam follower 201 are brought into abutment against each other at two points, specifically, a first contact point (first recessed-portion inlet edge) P1 and a second contact point (second recessed-portion inlet edge) P2.

At this time, because the plate-like material feeding device 100 is under maintenance work, the gas spring device 143 is stopped and does not generate a force of swinging the oscillation frame 100B about the oscillation shaft 144 in the clamping direction C. However, due to a self-weight of the oscillation frame 100B, the oscillation frame 100B is subjected to action of a force of moving the oscillation frame 100B about the oscillation shaft 144 in the clamping direction C.

Accordingly, the cam follower 201, which is supported on the oscillation frame 100B so as to be freely rotatable, is also subjected to action of a force (urging force) of returning the cam follower 201 to an original position (position in the clamping state), and hence the predetermined pressing force is applied from the cam follower 201 to the first contact point P1 and the second contact point P2.

As illustrated in FIG. 5, as components of the force to be applied to the first contact point P1 and the second contact point P2, components "a" and "b" of a force, which are both inward components, are generated. Thus, even when the circular cam 200 is rotated in any one of directions of the components "a" and "b" of the force due to some factors such as disturbance, the cam follower 201 acts so as to inhibit the rotation, and hence there exists a range in which a rotational motion of the circular cam 200 is hindered.

Thus, according to this embodiment, even when power or the like is turned off during the adjustment work or the maintenance work, or even when no special brake means is provided, the cam follower 201 is prevented from falling out of the recessed portion 200B of the circular cam 200 to cause unintentional rotation of the circular cam 200 and unintentional dropping of the upper roll 102 to the lower roll 101 side. Accordingly, the state during maintenance in which the upper roll 102 and the lower roll 101 are separated away from each other with a large opening may be safely kept.

In other words, according to this embodiment, it is possible to provide the plate-like material feeding device 100 that may smoothly make the state during maintenance with a sufficient opening amount, and may safely keep the state while keeping a relatively simple and low-cost configuration.

As illustrated in FIG. 5, in order to effectively exert the above-mentioned operations and effects, under a state in which the recessed portion 200B of the circular cam 200 and a part of the outer periphery of the cam follower 201 are held in contact with each other at two points, specifically, the first contact point (first recessed-portion inlet edge) P1 and the second contact point (second recessed-portion inlet edge) P2 of the recessed portion 200B in the cross section, it is preferred that the first contact point (first recessed-portion inlet edge) P1 and the second contact point (second recessed-portion inlet edge) P2 be located on sides opposite to each other with respect to a straight line Z connecting the rotation center X of the circular cam 200 and the rotation center Y of the cam follower 201 to each other.

However, the recessed shape (cross-sectional shape) of the recessed portion 200B of the circular cam 200 is not limited to a case in which the bottom surface 200C of the recessed portion 200B has a single curvature as illustrated in FIG. 4A, FIG. 5, and the like. Further, the shape of the bottom surface 200C may be a shape obtained by combining a plurality of curvatures with each other, or a groove GV1 (see FIG. 4A) having a groove shape with no curvature. A cross-sectional shape of the groove GV1 is not particularly limited.

That is, the shape of the bottom surface 200C is not particularly limited as long as the bottom surface 200C is not shaped in such a way that between the first contact point (first recessed-portion inlet edge) P1 and the second contact point (second recessed-portion inlet edge) P2, the bottom surface 200C of the recessed portion 200B and the cam follower 201 are held in abutment against each other but in non-contact with one of the first contact point (first recessed-portion inlet edge) P1 and the second contact point (second recessed-portion inlet edge) P2 (the bottom surface 200C of the recessed portion 200B and the cam follower 201 are separated away from each other at one of the first contact point P1 and the second contact point P2).

In other words, as the cross-sectional shape (recessed shape) of the recessed portion 200B of the circular cam 200, the present invention can encompass a shape receiving a part of the outer periphery of the cam follower 201 in contact with at least two points.

Figure 4B:
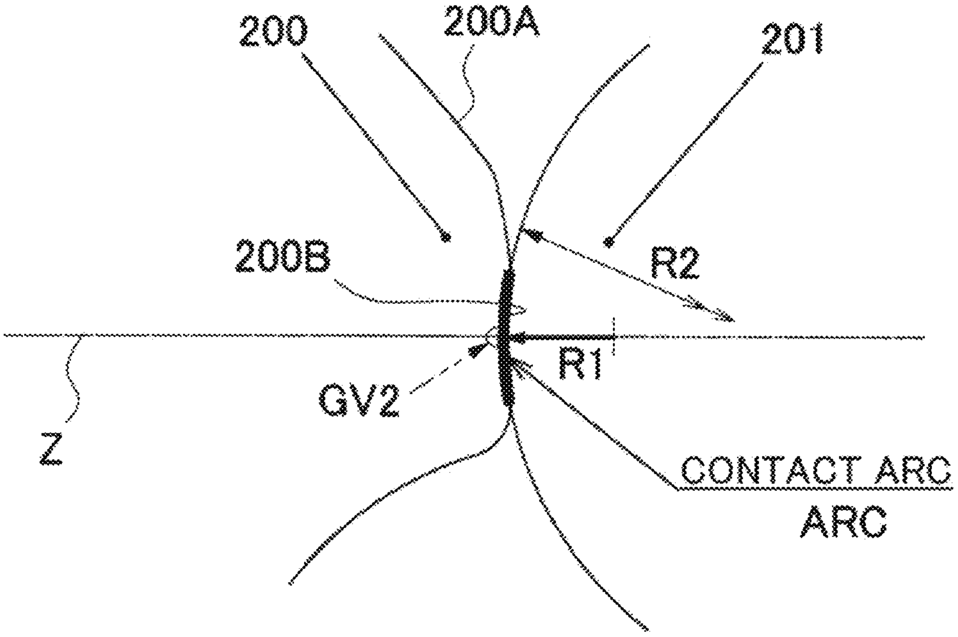
FIG. 4B is a cross-sectional view for illustrating, in an enlarged manner, another example of the state in which the part of the outer periphery of the cam follower is received in the recessed portion of the circular cam (state in which the cam follower is supported in surface contact with the recessed portion).

Next, as another example of the receiving mode, as illustrated in FIG. 4B, there is assumed a case in which the curvature R2 of the projecting shape of the outer periphery of the cam follower 201 is the same as the curvature R1 of the recessed shape (bottom surface 200C) of the recessed portion 200B of the circular cam 200.

In this case, instead of the components "a" and "b" of the force (concentrated load) illustrated in FIG. 5, a distributed load is applied to the recessed shape (bottom surface 200C) of the recessed portion 200B. However, also in such a case, inward components of a force are generated as the components of the force. Thus, even when the circular cam 200 is rotated in any one of directions of the components of the force due to some factors, the cam follower 201 acts so as to inhibit the rotation, and hence there exists a range in which the rotational motion of the circular cam 200 is hindered.

Accordingly, also in the mode illustrated in FIG. 4B, even when power or the like is turned off during the above-mentioned adjustment work or the maintenance work, or even when no special brake means is provided, the state during maintenance in which the upper roll 102 and the lower roll 101 are separated away from each other with a large opening may be safely kept.

In other words, also in the mode illustrated in FIG. 4B, it is possible to provide the plate-like material feeding device 100 that may smoothly make the state during maintenance with a sufficient opening amount, and may safely keep the state while keeping a relatively simple and low-cost configuration.

Similarly to the example illustrated in FIG. 5, in order to effectively exert the above-mentioned operations and effects, it is preferred that, in the cross section, a contact surface (contact arc) between the recessed portion 200B of the circular cam 200 and the part of the outer periphery of the cam follower 201 extend on both sides with respect to the straight line Z connecting the rotation center X of the circular cam 200 and the rotation center Y of the cam follower 201 to each other (FIG. 4B).

However, in the mode illustrated in FIG. 4B, it is not required that a contact arc ARC extend continuously from an end to another end of the contact arc ARC in a plane in FIG. 4B. The contact arc ARC may have a shape partially having a void, which is materialized by, for example, a streak-like groove GV2 (see FIG. 4B) formed between the ends of the contact arc ARC. A cross-sectional shape and the number of the streak-like groove GV2, and the like are not particularly limited.

In other words, as the cross-sectional shape (recessed shape) of the recessed portion 200B of the circular cam 200 in this embodiment, the present invention can encompass a shape receiving the part of the outer periphery of the cam follower 201 in surface contact with a part of the bottom surface 200C of the recessed portion 200B.

In summary, as the cross-sectional shape (recessed shape) of the recessed portion 200B of the circular cam 200 in this embodiment, the present invention can encompass a shape receiving the part of the outer periphery of the cam follower 201 in contact with at least two points (the mode illustrated in FIG. 4A), or a shape receiving the part of the bottom surface 200C of the recessed portion 200B in surface contact with the recessed portion 200B (the mode illustrated in FIG. 4B).

Figure 6A:
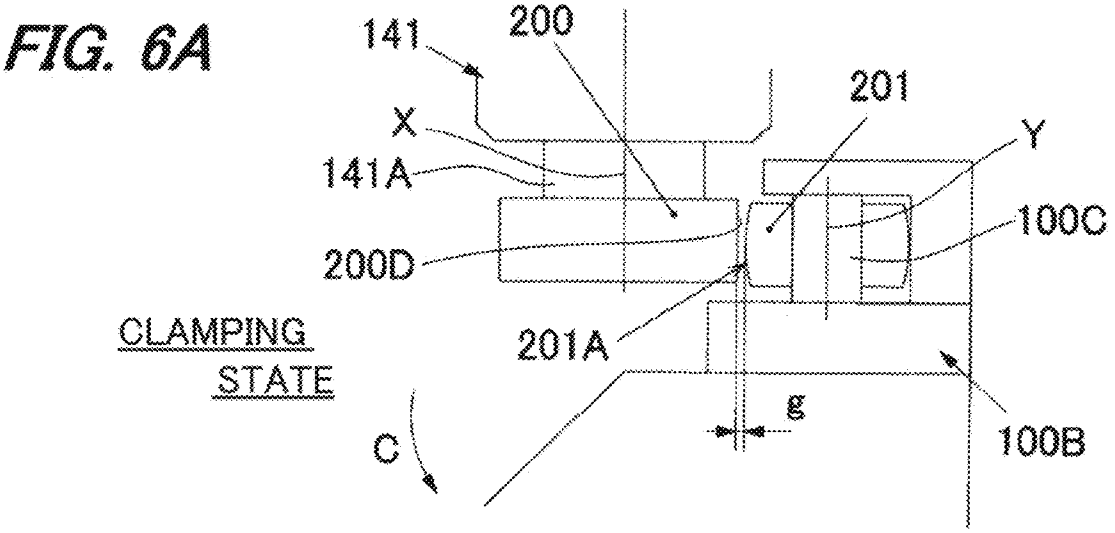
FIG. 6A is a view for illustrating a condition in the clamping state in a vicinity of a contact portion between the circular cam and the cam follower.
Figure 6B:
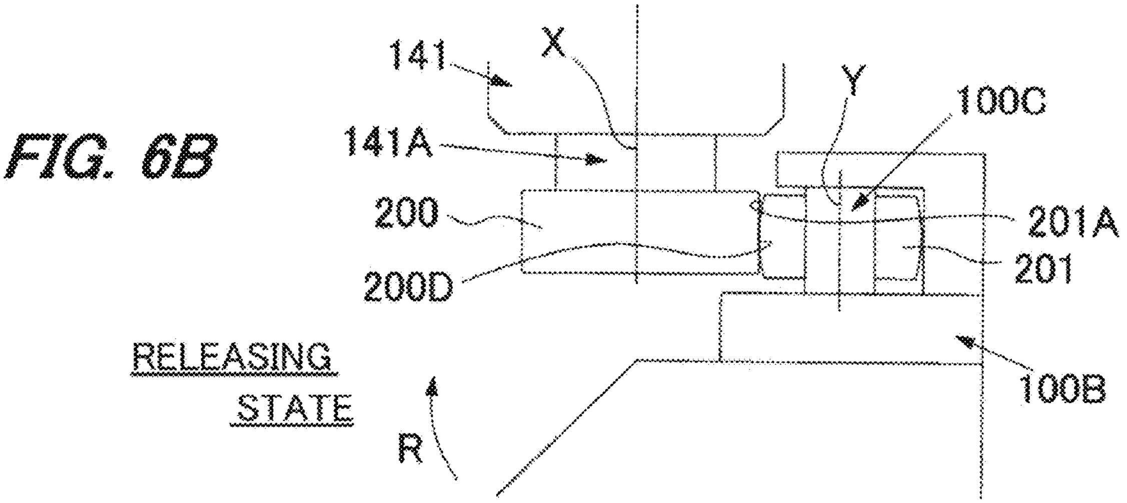
FIG. 6B is a view for illustrating a condition in the releasing state in the vicinity of the contact portion between the circular cam and the cam follower.
Figure 6C:
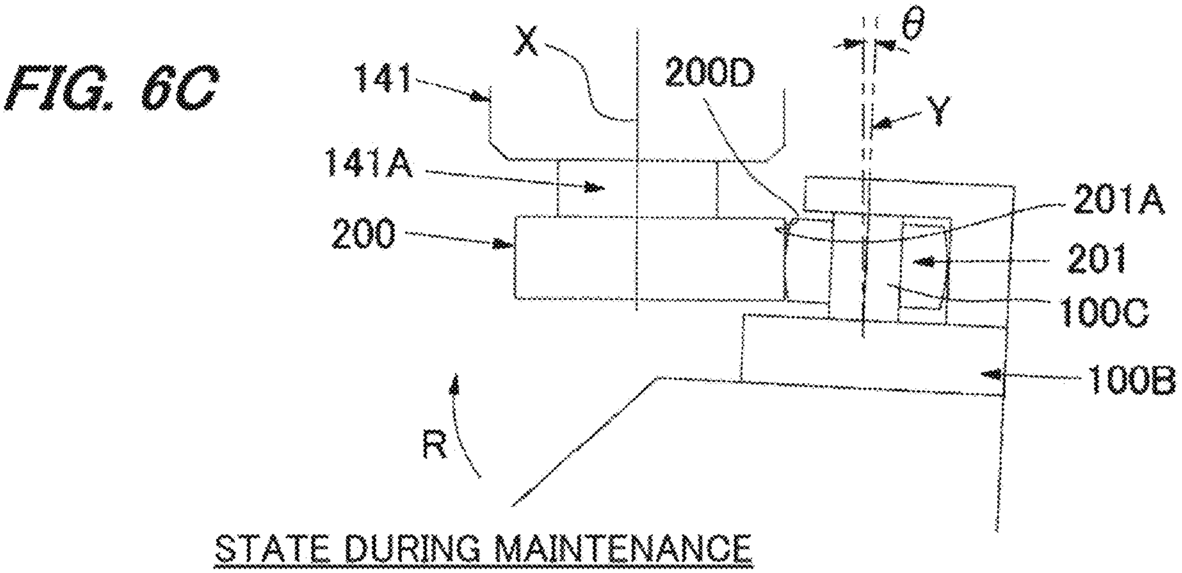
FIG. 6C is a view for illustrating a condition in the state during maintenance in the vicinity of the contact portion between the circular cam and the cam follower.

Conditions in the vicinity of an abutment portion (contact portion) between the circular cam 200 and the cam follower 201 in the clamping and releasing mechanism 140 in this embodiment in the clamping state, the releasing state, and the maintenance state are illustrated in FIG. 6A to FIG. 6C in an enlarged manner.

The circular cam 200 is coaxially mounted to the rotation output shaft 141A (rotation center X) of the clamping and releasing motor 141, and the cam follower 201 is supported on the support shaft 100C through intermediation of a bearing or the like so as to be rotatable. The support shaft 100C is supported on the oscillation frame 100B (rotation center Y) substantially integrally.

The state illustrated in FIG. 6A corresponds to the clamping state in this embodiment.

In this state, the circular cam 200 is opposed to and substantially parallel to the cam follower 201 with a predetermined gap "g". In this embodiment, owing to the predetermined gap "g", the gas spring device 143 gives the predetermined pressing force in the clamping direction C to the oscillation frame 100B and, in turn, the upper roll 102, and thus the plate-like material M can be sandwiched between the lower roll 101 and the upper roll 102 with the predetermined pressing force. Accordingly, in this embodiment, the outer peripheral profile of the circular cam 200 is set so as to enable the predetermined gap "g" to be defined in the vicinity of the clamping position (CP in FIG. 3) (see FIG. 2D and FIG. 3).

The state illustrated in FIG. 6B corresponds to the releasing state in this embodiment.

In this state, the circular cam 200 presses the cam follower 201 in abutment against the cam follower 201, and lifts the oscillation frame 100B and, in turn, the upper roll 102 in the releasing direction R against the predetermined pressing force applied by the gas spring device 143, thereby releasing the plate-like material M from the pressing force applied by the lower roll 101 and the upper roll 102. Accordingly, in this embodiment, the outer peripheral profile of the circular cam 200 is set so as to make the separation amount (opening amount) between the lower roll 101 and the upper roll 102 larger than the plate thickness of the plate-like material M in the vicinity of the releasing position (RP in FIG. 3) (see FIG. 2E and FIG. 3).

In this embodiment, the clamping position (rotational angle position at CP in FIG. 3) and the releasing position (rotational angle position at RP in FIG. 3) can be easily changed (adjusted) in accordance with the plate thickness of the plate-like material M or the like, and can be easily changed (adjusted) by changing the rotational angle position of the circular cam 200 to change the lift amount of the cam follower 201.

The state illustrated in FIG. 6C corresponds to the state during maintenance in this embodiment.

In this state, the circular cam 200 further lifts the cam follower 201 from the state illustrated in FIG. 6B by the projecting portion 200A providing a large lift amount, and the part of the outer periphery of the cam follower 201 is received in the recessed portion 200B formed in the vicinity of the top of the projecting portion 200A. The outer peripheral profile of the circular cam 200 is set so as to obtain the above-mentioned receiving state (see FIG. 2F, FIG. 3, FIG. 4A, FIG. 4B, and the like).

At this time, the cam follower 201 and the oscillation frame 100B are swung about the oscillation shaft 144 in a predetermined manner and are kept (held) at the positions (under a state in which the separation amount (opening amount) between the lower roll 101 and the upper roll 102 is increased) such that the rotation output shaft 141A (rotation center X) of the circular cam 200 and the support shaft 100C (rotation center Y) of the cam follower 201 are not parallel to each other but intersect each other with a predetermined inclination angle θ.

In this embodiment, the rotation output shaft 141A (rotation center X) of the circular cam 200 and the support shaft 100C (rotation center Y) of the cam follower 201 intersect each other with the predetermined inclination angle θ. Thus, when an outer peripheral surface 201A of the cam follower 201 is a flat surface parallel to the support shaft 100C, this configuration may constitute such an obstacle that the outer peripheral surface 201A of the cam follower 201 is brought into edge abutment against an outer peripheral surface 200D of the circular cam 200. Accordingly, as illustrated in FIG. 6C, the outer peripheral surface 201A of the cam follower 201 is formed into a spherical shape (barrel shape or circular arc shape in section). With this configuration, abrasion of the outer peripheral surface 200D of the circular cam 200 and the like can be prevented, thereby being capable of keeping the outer peripheral profile of the circular cam satisfactory for a long term.

As described above, according to the plate-like material feeding device 100 in this embodiment, in the recessed portion 200B formed in the circular cam 200, the cam follower 201 opposed to the circular cam 200 is received. With this configuration, the position of the upper roll 102 is mechanically held even when a power source is cut off. Thus, the adjustment work at the time of jamming (or clogging) with material or meandering feed, and the maintenance work such as roll cleaning can be safely performed.

Further, the state in which the cam follower 201 is received in the recessed portion 200B formed in the circular cam 200 can be used as a mechanical origin for releasing operation. Thus, a setting position is clearly determined, and setting can be easily performed even when resetting is required due to, for example, electrical trouble or motor replacement.

In other words, when the circular cam having the shape as in the related art is used, a cam surface is such a smooth curve as to be always held in contact with the cam follower at one point in relation with the cam follower. Accordingly, at the time of setting a servo origin of a cam shaft, which is required due to electrical trouble or motor replacement, it is required to match a phase of the circular cam through alignment of an engraved mark or the like serving as a sign. In this case, precise alignment of the cam is difficult, but this can be solved according to this embodiment.

As described above, according to this embodiment, it is possible to provide the user-friendly plate-like material feeding device that may easily adjust the clamping state and the releasing state in accordance with the thickness of the plate-like material, may smoothly make a state during maintenance with a sufficient opening amount, may safely keep the state, and does not require, for example, setting of a positional relationship between the circular cam and the cam follower side after maintenance work or the like, while keeping a relatively simple and low-cost configuration.

In this embodiment, description is given of the example of the configuration including the lower roll 101 and the upper roll 102, in which the lower roll 101 is rotationally driven by the lower-roll drive motor 110, and the upper roll 102 is rotationally driven by the upper-roll drive motor 130, thereby feeding out the plate-like material M. However, the present invention is not limited to this configuration. There may be adopted a configuration in which only any one of the lower roll 101 and the upper roll 102 is rotationally driven.

Further, in this embodiment, description is given of the example of the configuration including the lower roll 101 and the upper roll 102, in which the upper roll 102 side is brought close to or separated away from (caused to approach to or separate from) the lower roll 101 through the circular cam and the cam follower, thereby making the clamping state, the releasing state, and the state during maintenance with respect to the plate-like material M. However, the present invention is not limited to this configuration. There may be adopted a configuration in which any one of the lower roll 101 and the upper roll 102 is brought close to or separated away from (caused to approach to or separate from) another one.

In this embodiment, as the device that gives the pressing force to the upper roll 102, the gas spring device 143 is described by way of example, but the present invention is not limited thereto. Other actuators of various types may be used.

As described above, according to the present invention, it is possible to provide the user-friendly plate-like material feeding device that may easily adjust the clamping state and the releasing state in accordance with the thickness of the plate-like material, may smoothly make a state during maintenance with a sufficient opening amount, may safely keep the state, and does not require, for example, setting of a positional relationship between the circular cam and the cam follower side after maintenance work or the like, while keeping a relatively simple and low-cost configuration.

The embodiment of the present invention as described above are each merely an example for describing the present invention, and various modifications may be made without departing from the gist of the present invention.

What is claimed is:

1. A plate-like material feeding device, which is configured to convey a plate-like material by sandwiching the plate-like material between a lower roll rotatably supported on a device main body and an upper roll, which is rotatable and arranged in parallel to the lower roll, and giving rotational drive to at least one of the lower roll or the upper roll, the plate-like material feeding device comprising:

a clamping and releasing mechanism configured to perform switching between a clamping state in which at least one of the upper roll or the lower roll coupled to a cam follower is brought close to another one and a releasing state in which at least one of the upper roll or the lower roll is separated away from another one by moving the cam follower in accordance with an outer peripheral profile of a circular cam, the plate-like material feeding device being configured to convey the plate-like material under the clamping state, and release the plate-like material in the releasing state during operation, wherein the outer peripheral profile of the circular cam has a projecting portion formed to increase a lift amount in a range different from a rotation angle range during the operation that is from a rotational angle position of the circular cam in the clamping state to a rotational angle position of the circular cam in the releasing state, and the projecting portion has a recessed portion, which is formed in a vicinity of the top of the projecting portion and is configured to receive a part of an outer periphery of the cam follower in contact with at least two points, or a recessed portion configured to receive a part of the outer periphery of the cam follower in surface contact with a part of a bottom surface of the recessed portion.

2. The plate-like material feeding device according to claim 1, wherein in a cross section of the recessed portion orthogonal to a center axis of the circular cam, when the recessed portion of the circular cam and the part of the outer periphery of the cam follower are held in contact with each other at two points including a first inlet edge and a second inlet edge, the first inlet edge and the second inlet edge are located on sides opposite to each other with respect to a straight line connecting a rotation center of the circular cam and a rotation center of the cam follower to each other.

3. The plate-like material feeding device according to claim 1, wherein in a cross section of the recessed portion orthogonal to a center axis of the circular cam, when the recessed portion of the circular cam receives the part of the outer periphery of the cam follower in surface contact with the part of the bottom surface of the recessed portion, a contact surface between the circular cam and the cam follower extends on both sides with respect to a straight line connecting a rotation center of the circular cam and a rotation center of the cam follower to each other.

4. The plate-like material feeding device according to claim 2, wherein when the recessed portion of the circular cam and the part of the outer periphery of the cam follower are held in contact with each other at two points including the first inlet edge and the second inlet edge, during maintenance, rotation of the circular cam is prevented by applying, to the two points, a self-weight of an oscillation frame coupled to the cam follower.

5. The plate-like material feeding device according to claim 3, wherein when the recessed portion of the circular cam receives the part of the outer periphery of the cam follower in surface contact with the part of the bottom surface of the recessed portion, during maintenance, rotation of the circular cam is prevented by applying, to a surface contact portion between the circular cam and the cam follower, a self-weight of an oscillation frame coupled to the cam follower.

6. The plate-like material feeding device according to claim 1, wherein under a state in which the recessed portion of the circular cam receives the part of the outer periphery of the cam follower in contact with at least two points, or a state in which the recessed portion of the circular cam receives the part of the outer periphery of the cam follower in surface contact with the part of the bottom surface, the cam follower has a lift amount larger than a lift amount of the cam follower in the releasing state.

7. The plate-like material feeding device according to claim 2, wherein under a state in which the recessed portion of the circular cam receives the part of the outer periphery of the cam follower in contact with at least two points, the cam follower has a lift amount larger than a lift amount of the cam follower in the releasing state.

8. The plate-like material feeding device according to claim 3, wherein under a state in which the recessed portion of the circular cam receives the part of the outer periphery of the cam follower in surface contact with the part of the bottom surface, the cam follower has a lift amount larger than a lift amount of the cam follower in the releasing state.

* * * * *